(12) United States Patent
Mori

(10) Patent No.: US 11,736,038 B2
(45) Date of Patent: Aug. 22, 2023

(54) VIBRATION ACTUATOR REDUCED IN SIZE AND SUPPRESSED IN GENERATING ABNORMAL NOISE AND OPTICAL DEVICE

(71) Applicant: CANON KABUSHIKI KAISHA, Tokyo (JP)

(72) Inventor: Takao Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/682,535

(22) Filed: Feb. 28, 2022

(65) Prior Publication Data
US 2022/0278632 A1 Sep. 1, 2022

(30) Foreign Application Priority Data
Mar. 1, 2021 (JP) .................................. 2021-031805

(51) Int. Cl.
*H02N 2/00* (2006.01)
*H02N 2/02* (2006.01)

(52) U.S. Cl.
CPC ........... *H02N 2/0065* (2013.01); *H02N 2/002* (2013.01); *H02N 2/006* (2013.01); *H02N 2/0045* (2013.01); *H02N 2/026* (2013.01)

(58) Field of Classification Search
CPC .... H02N 2/0065; H02N 2/002; H02N 2/0045; H02N 2/006; H02N 2/0026; H02N 2/103; H02N 2/0015; G02B 7/08; G02B 7/04; G03B 3/10; G03B 5/02; G03B 13/34; G03B 2205/0061
See application file for complete search history.

(56) References Cited

U.S. PATENT DOCUMENTS

| 2011/0031847 A1* | 2/2011 | Sakamoto | H02N 2/026 |
| | | | 310/323.02 |
| 2018/0109205 A1* | 4/2018 | Osawa | H02N 2/0065 |

FOREIGN PATENT DOCUMENTS

JP 2018-067983 A 4/2018

\* cited by examiner

*Primary Examiner* — Emily P Pham
(74) *Attorney, Agent, or Firm* — Cowan, Liebowitz & Latman, P.C.

(57) ABSTRACT

A vibration actuator suppressed in generating abnormal noise while realizing size reduction. The vibration actuator includes a vibration element having a piezoelectric element and an elastic member, and a contact body in contact with the vibration element. The contact body has a direction in which the vibration element and the contact body move relative to each other as a longitudinal direction and a square bar shape substantially uniform in width and thickness in the longitudinal direction, and includes a first section and a second section which are formed with respective R surfaces different in curvature radius on an edge extending in the longitudinal direction, in an area where the contact body performs frictional sliding on the vibration element.

16 Claims, 11 Drawing Sheets

30A

FIRST SECTION

VIBRATION ACTUATOR REDUCED IN SIZE AND SUPPRESSED IN GENERATING ABNORMAL NOISE AND OPTICAL DEVICE

BACKGROUND OF THE INVENTION

Field of the Invention

The present invention relates to a vibration actuator and an optical device.

Description of the Related Art

A vibration actuator has characteristics that it is capable of generating a large thrust and performing positioning with high accuracy, and is excellent in quietness, and is widely used e.g. for driving a focus lens or an image blur correction leas of an image capturing apparatus. Further, in recent years, the vibration actuator is used as a drive source for a panning drive device or a tilting drive device for a lens of a monitoring camera or a network camera.

The vibration actuator is a drive device that generates a thrust (drive force) by bringing a vibration element and a contact body into frictional contact with each other to thereby excite predetermined vibration in the vibration element and move the vibration element and the contact body relative to each other. Therefore, when driving the vibration actuator, unnecessary vibration is sometimes generated in the contact body due to the vibration excited in the vibration element, and the unnecessary vibration generated in the contact body sometimes causes abnormal noise. Therefore, it is desirable to prevent unnecessary vibration from being generated in the contact body when driving the vibration actuator.

To suppress generation of vibration in the contact body, in most cases, the vibration actuator is designed so as to prevent the drive frequency of the vibration element and the resonance frequency of the contact body from matching each other. However, for example, a contact body as a component of a linear drive-type vibration actuator often has not only typical vibrations, such as out-of-plane vibration, in-plane vibration, and torsional vibration, but also a variety of characteristic vibration modes specific to its shape. To cope with this problem, Japanese Laid-Open Patent Publication (Kokai) No. 2018-67983 has proposed a vibration actuator (vibration motor) designed such that the frequencies in all characteristic vibration modes of the contact body are away from the drive frequency by a predetermined value or more.

There is a strong demand for the vibration actuator not only to be suppressed in the above-mentioned generation of abnormal noise, but also to be reduced in size and weight. To meet this request, for example, in a case where the thickness of the contact body is reduced, in general, the resonance frequency in a characteristic vibration mode of the contact body is shifted to a lower-frequency side, and a frequency interval between adjacent orders of frequency is reduced (narrowed). As a result, it is difficult to design the vibration actuator so as to cause all characteristic vibration modes in the vicinity of the drive frequency to be outside the drive frequency band of the vibration element, so that a situation can occur in which unnecessary vibration is excited in the contact body wider a specific driving condition, causing generation of abnormal noise in an audible range.

SUMMARY OF THE INVENTION

The present invention provides a vibration actuator that is suppressed in generating abnormal noise while realizing size reduction, and an optical device including the vibration actuator.

In a first aspect of the present invention, there is provided a vibration actuator including a vibration element including an electromechanical energy conversion element and an elastic member, and a contact body in contact with the vibration element, wherein the contact body has a direction in which the vibration element and the contact body move relative to each other as a longitudinal direction, and a square bar shape which is substantially uniform in width and thickness in the longitudinal direction, and includes a first section and a second section which are formed with respective R surfaces different in curvature radius on an edge extending in the longitudinal direction, in an area where the contact body performs frictional sliding on the vibration element.

In a second aspect of the present invention, there is provided a vibration actuator including a vibration element including an electromechanical energy conversion element and an elastic member, and a contact body in contact with the vibration element, wherein the contact body has an annular shape substantially uniform in width in a radial direction and thickness in an axial direction, in which a surface parallel to the radial direction is a frictional sliding surface on the vibration element, and includes a first section and a second section having respective R surfaces different in curvature radius formed on an outer peripheral edge.

In a third aspect of the present invention, there is provided an optical device including a vibration actuator, and an optical component driven by the vibration actuator, the vibration actuator including a vibration element including an electromechanical energy conversion element and an elastic member, and a contact body in contact with the vibration element, wherein the contact body has a direction in which the vibration element and the contact body move relative to each other as a longitudinal direction, and a square bar shape which is substantially uniform in width and thickness in the longitudinal direction, and includes a first section and a second section which are formed with respective R surfaces different in curvature radius on an edge extending in the longitudinal direction, in an area where the contact body performs frictional sliding on the vibration element.

In a fourth aspect of the present invention, there is provided an optical device including a vibration actuator, and an optical component driven by the vibration actuator, the vibration actuator including a vibration element including an electromechanical energy conversion element and an elastic member, and a contact body in contact with the vibration element, wherein the contact body has an annular shape substantially uniform in width in a radial direction and thickness in an axial direction, in which a surface parallel to the radial direction is a frictional sliding surface on the vibration element, and includes a first section and a second section having respective R surfaces different in curvature radius formed on an outer peripheral edge.

According to the present invention, it is possible to realize a vibration actuator that is suppressed in generating abnormal noise while realizing size reduction, and an optical device including the vibration actuator.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Vibration actuators according to the embodiments of the present invention each have major characteristics in the structure of a contact body compared with a vibration actuator according to prior art, but on the other hand, the vibration actuator can be formed without substantial difference in the other components of the configuration. Therefore, first, a description will be given of an example of a well-known configuration of the vibration actuator, and then a contact body as a characterizing component of the vibration actuator according to each embodiment of the present invention will be described.

Figure 1A:
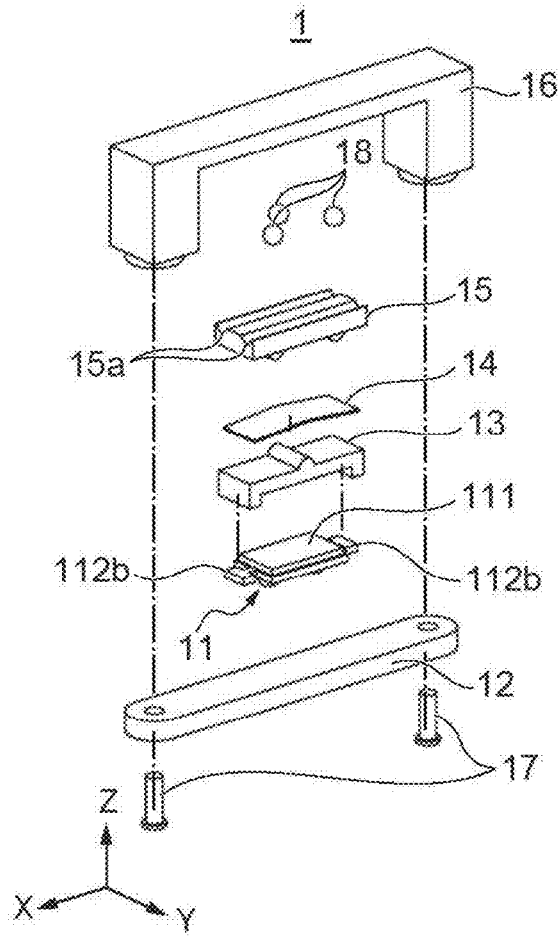
FIGS. 1A to 1D are views showing an outline configuration of a linear drive-type vibration actuator.
Figure 1B:
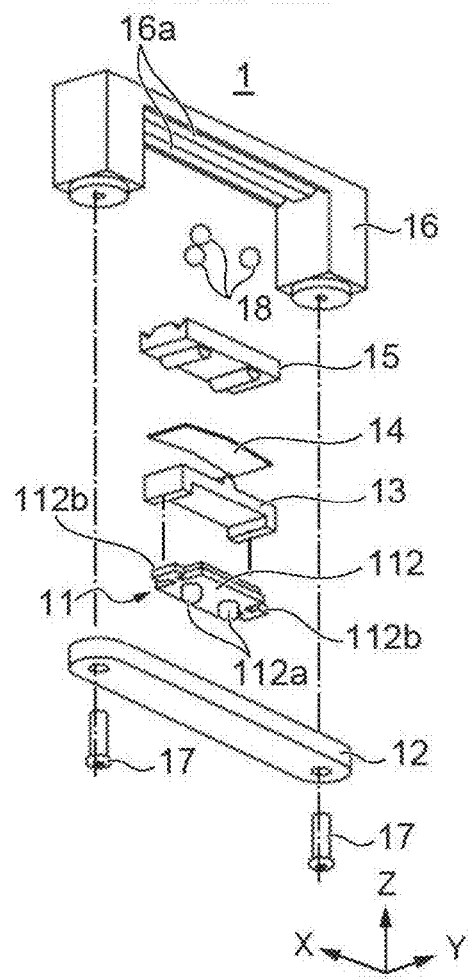
Figure 1C:
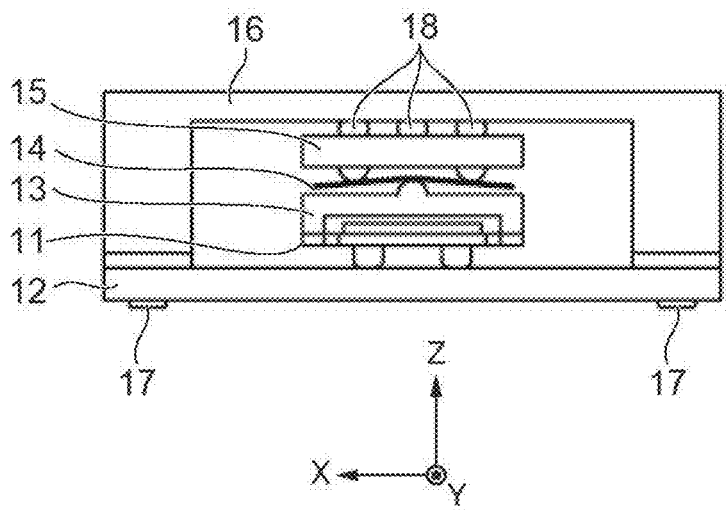
Figure 1D:
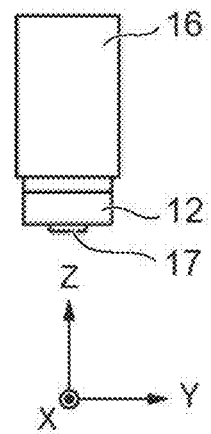

FIGS. 1A and 1B are exploded perspective views of a linear drive-type vibration actuator 1, and FIGS. 1A and 1B differ from each other in the direction of viewing the elements (components) of the vibration actuator 1. FIG. 1C is a front view of the vibration actuator 1 and FIG. 1D is a side view of the vibration actuator 1.

To explicitly show corresponding relationships between the drawings, and further, for convenience of explanation, an X axis (X direction), a Y axis (Y direction), and a Z axis (Z direction), which are orthogonal to one another, are defined as shown in FIGS. 1A to 1D. The directions indicated by the X direction, the Y direction, and the Z direction, respectively, will be explained when describing the components of the vibration actuator 1.

The vibration actuator 1 includes a vibration element 11 a contact body 12, a holding member 13, a pressing member 14, a guided member 15, a fixing member 16, screws 17, and rolling members 18. The vibration element has a rectangular plate-shaped elastic member 112 and a rectangular plate-shaped piezoelectric element 111 as an example of an electromechanical energy conversion element. One of two surfaces of the elastic member 112, which face a thickness direction (Z direction), i.e. two planes perpendicular to the Z direction, has the piezoelectric element 111 bonded thereto, and the other is formed with two protrusions 112a protruding toward the contact body 12 at a predetermined space interval in the X direction. Further, opposite ends of the elastic member 112 in a longitudinal direction (X direction) are provided with held portions 112b extending outward (in ±X directions), respectively.

For example, the piezoelectric element 111 is formed of a piezoelectric ceramic of lead zirconate inmate (PZT), and the elastic member 112 is formed of a metal, such as stainless steel. By applying an AC voltage of a predetermined frequency to the piezoelectric element 111, it is possible to excite vibrations in predetermined vibration modes in the vibration element 11 to thereby cause the tip ends of the protrusions 112a to perform elliptical motion. Note that the mechanism for generating elliptical motion at the tip ends of the protrusions 112a is known, and hence detailed description is omitted here.

The held portions 112b are bonded and fixed to the holding member 13. Thus, the vibration element 11 is held by the holding member 13 such that excitation of the vibration is prevented from being inhibited. The pressing member 14 is e.g. a leaf spring and brings the protrusions 112a into pressure contact with the contact body 12 by pressing the holding member 13 toward the contact body 12 with a reaction force generated by elastic deformation. The guided member 15 sandwiches the pressing member 14 between the same and the holding member 13 to thereby elastically deform the pressing member 14.

The guided member 15 is formed with two guide grooves 15a extending in a driving direction (X direction) of the vibration actuator 1. The fixing member 16 is formed with two guide grooves 16a extending in the X direction such that the guide grooves 16a are opposed to the two guide grooves 15a of the guided member 15 in the Z direction.

The contact body 12 has a square bar shape of which the longitudinal direction is the X direction and of which a width (length in the Y direction) orthogonal to the longitudinal direction is larger than a thickness (length in the Z direction) thereof. Note that the longitudinal direction of the contact body 12 is a direction in which the vibration element 11 and the contact body 12 move relative to each other, as will be described hereinafter.

Respective portions close to opposite ends of the contact body 12 in the longitudinal direction are formed with holes extending therethrough in the thickness direction (Z direction). The screws 17 (fastening members) are inserted through the holes formed in the contact body 12 and fastened to the fixing member 16, whereby the contact body 12 is fixed to the fixing member 16. A cross-section of the contact body 12, cut along a plane (Y-Z plane) orthogonal to the longitudinal direction (X direction) is uniform in the longitudinal direction.

The rolling members 18 each having a spherical shape (balls) are sandwiched between the guide grooves 15a formed in the guided member 15 and the guide grooves 16a formed in the fixing member 16, whereby the guided member 15 is held on the fixing member 16 such that the guided member 15 is movable only in the X direction.

In the vibration actuator 1, when predetermined vibration is excited in the vibration element 11 to cause the protrusions 112a to perform elliptical motion within a Z-X plane, a driving force for moving the vibration element 11 and the contact body 12 relative to each other in the X-direction is generated at the contact surfaces between the protrusions 112a and the contact body 12. This causes the vibration element 11, the holding member 13, the pressing member 14, and the guided member 15 to move in unison in the X direction, which is the driving direction, relative to the contact body 12 and the fixing member 16.

Figure 2A:
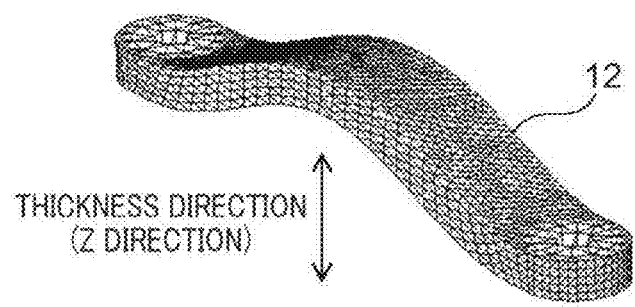
FIGS. 2A to 2C are views useful in explaining forms of vibrations in typical characteristic vibration modes of a contact body.
Figure 2B:
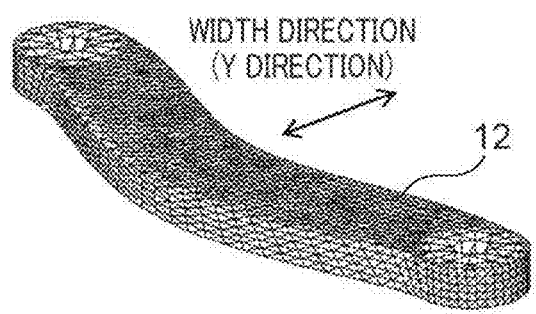
Figure 2C:
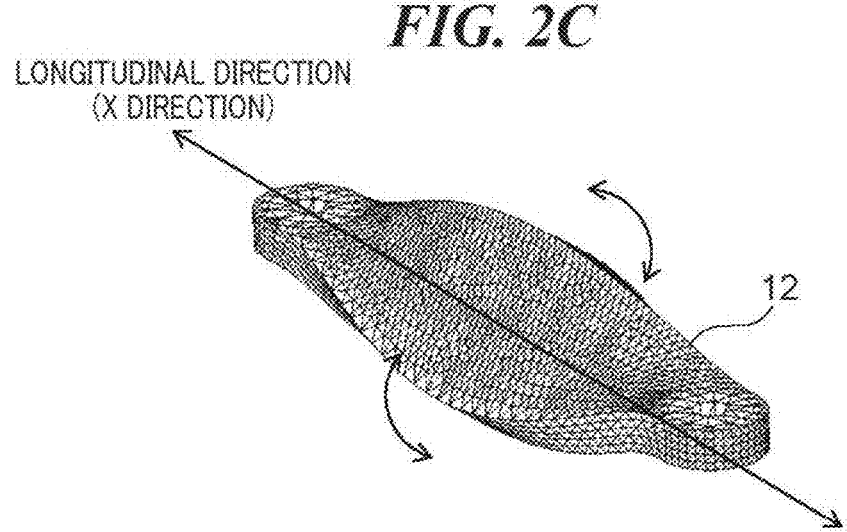

FIGS. 2A to 2C are views useful in explaining forms of vibrations in typical characteristic vibration modes of the contact body 12. FIG. 2A schematically shows out-of-plane bending vibration having an amplitude in the thickness direction (Z direction) of the contact body 12. FIG. 2B schematically shows in-plane bending vibration having an amplitude in the width direction (Y direction) of the contact body 12. FIG. 2C schematically shows torsional vibration having an amplitude of torsion about an axis in the longitudinal direction of the contact body 12 as the rotational axis. Here, although resonance modes in each of which the resonance frequency is the smallest in an associated form of vibration, i.e. resonance modes each having one crest of vibration, are shown as representatives, there are characteristic vibration modes of a higher order of frequency each having a plurality of crests, on a higher frequency side than the illustrated ones.

Next, a vibration actuator according to a first embodiment of the present invention will be described. The vibration actuator according to the first embodiment differs from the vibration actuator 1 shown in FIGS. 1A to 1D in that a contact body 30 or a contact body 30A, described hereinafter, is included in place of the contact body 12 as a component of the vibration actuator 1. Therefore, the following description will be given mainly of the configuration of the contact bodies 30 and 30A.

Figure 3A:
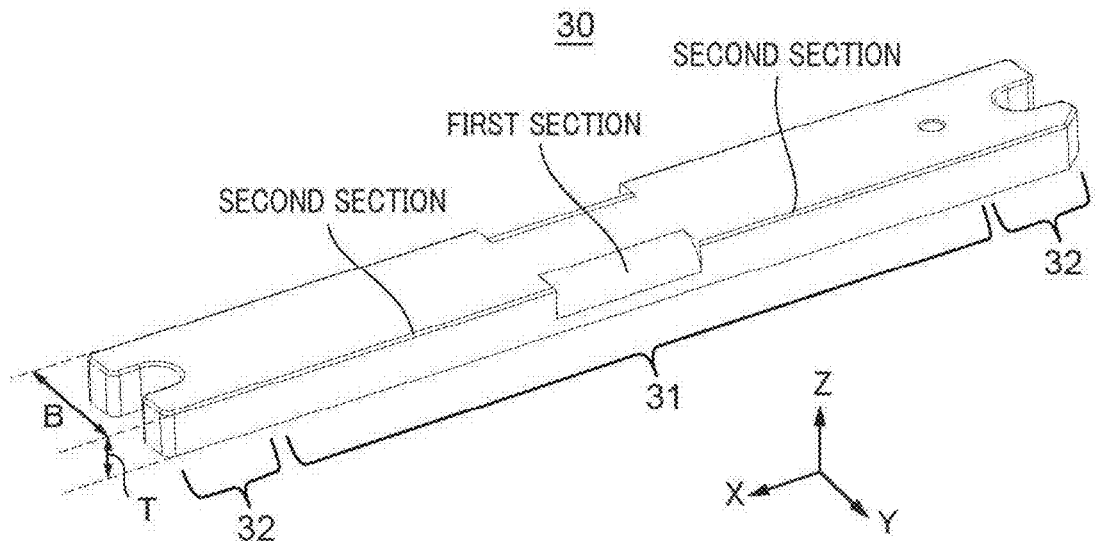
FIGS. 3A to 3C are views useful in explaining the structure of a contact body used in a vibration actuator according to a first embodiment.
Figure 3B:
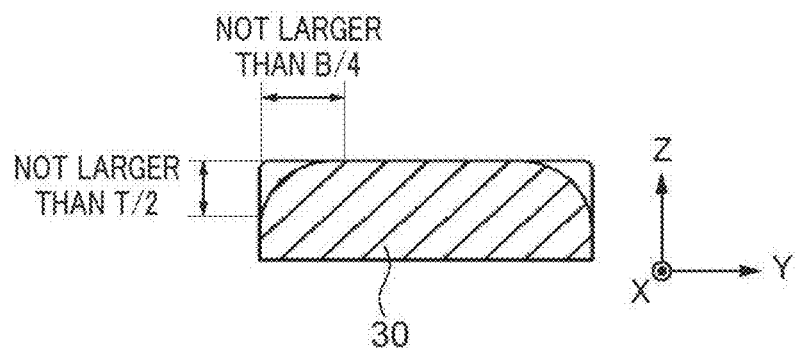
Figure 3C:
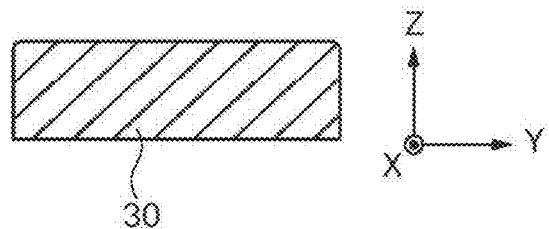

FIGS. 3A to 3C are views useful in explaining the structure of the contact body 30 used for the vibration actuator according to the first embodiment of the present invention. More specifically, FIG. 3A is a perspective view of the appearance of the contact body 30. Note that similar to the contact body 12, the longitudinal direction, the width direction, and the thickness direction of the contact body 30 are also defined as the X direction, the Y direction, and the Z direction, respectively. The contact body 30 has a square bar shape having substantially uniform width and thickness, similar to the contact body 12.

Opposite ends of the contact body 30 in the longitudinal direction (X direction) are formed with fixing portions 32 for fastening the contact body 30 to the fixing member 16 with the screws 17, and a frictional portion 31 is formed between the fixing portions 32 formed at the opposite ends in the longitudinal direction. One of front and reverse surfaces (surfaces orthogonal to the Z direction (along X-Y plane)) of the frictional portion 31 forms a frictional sliding surface associated with the protrusions 112a of the vibration element 11.

The frictional portion 31 has a first section and second sections having R surfaces formed at two edges on the front surface side (+Z side) of four edges of the contact body 30 extending in the longitudinal direction such that the R surface of the first section is different in curvature radius from the R surfaces of the second sections. The first section is provided in substantially the center of the frictional portion 31 in the longitudinal direction, and the two second sections are provided such that the second sections sandwich the first section in the longitudinal direction.

FIG. 3B is a Y-Z cross-sectional view (view showing a cross section orthogonal to the X direction) of the first section of the contact body 30. FIG. 3C is a Y-Z cross-sectional view of the second section of the contact body 30. There is no difference in shape between the first section and the second sections with respect to the two edge potions on the reverse surface side (-Z side) out of the four edge portions of the contact body 30 which extend in the longitudinal direction. On the other hand, with respect to the two edge potions on the front surface side (+Z side) out of the four edge portions of the contact body 30 which extend in the longitudinal direction, the curvature radius of the R surfaces of the first section is relatively larger than the curvature radius of the R surfaces of the second section. That is, the first section is formed with the R surfaces each having a relatively larger curvature radius than the second sections. The R surface can be formed by R surface-chamfering, including any of cutting, grinding, polishing, and the like. In a case where the contact body 30 is molded by the casting method, the R surface can also be formed by using a casting mold.

Each R surface of the first section is formed in an area extending on a front surface side (X-Y plane side) over a length not larger than ¼ of a width B of the contact body 30 (frictional portion 31) from the edge on the front surface side and extending on a side surface side (Z-X plane side) over a length not larger than ½ of a thickness T of the contact body 30 (frictional portion 31) from the edge on side surface side. An amount of a portion of the first section removed by R-chamfering is configured to be not larger than the maximum amount assumed to be removed by C-chamfering under the limitation of the range of the above-mentioned dimensions.

Note that the edges of the contact body 30, where the first section and the second sections can be provided, are limited to the four edges extending in the longitudinal direction. Although in the contact body 30, the R surfaces which are different in curvature radius are provided on the two edges on the front surface side, the R surfaces which are different in curvature radius may be provided on the two edges on the reverse surface side. Further, the R surfaces which are different in curvature radius can be provided on all of the four edges extending in the longitudinal direction. Further, although in the contact body 30, the R surface having a large curvature radius is provided only at one location of each edge on the front surface side, the R surface having a large curvature radius is not limitatively provided at one location, but can be provided at a plurality of locations (more specifically, two or four locations). Further, although in the contact body 30, the curvature radius of the R surface is uniform in the first section, the curvature radius of the R surface in the first section may be varied in the longitudinal direction. The length of the first section of the contact body 30 M the longitudinal direction has a limitation, and this limitation will be described hereinafter.

The fixing portions 32 are portions for fixing the contact body 30 to the fixing member 16 with the screws 17 and are each in the form of a U-shaped groove. The screws 17 are inserted through the U-shaped grooves in the thickness direction and fastened to the fixing member 16, whereby the contact body 30 is fixed to the fixing member 16. The contact body 30 is a structure body formed such that the fixing portions 32 and the frictional portion 31 are continuous with each other with the same thickness and the same width, but the thickness and the shape of each fixing portion 32 are not limited to this. For example, each fixing portion 32 may be different in thickness and width from the frictional portion 31, a through hole may be provided in place of the U-shaped groove similarly to the contact body 12, and further, fixing may be effected by other means than the screw 17.

Figure 4A:
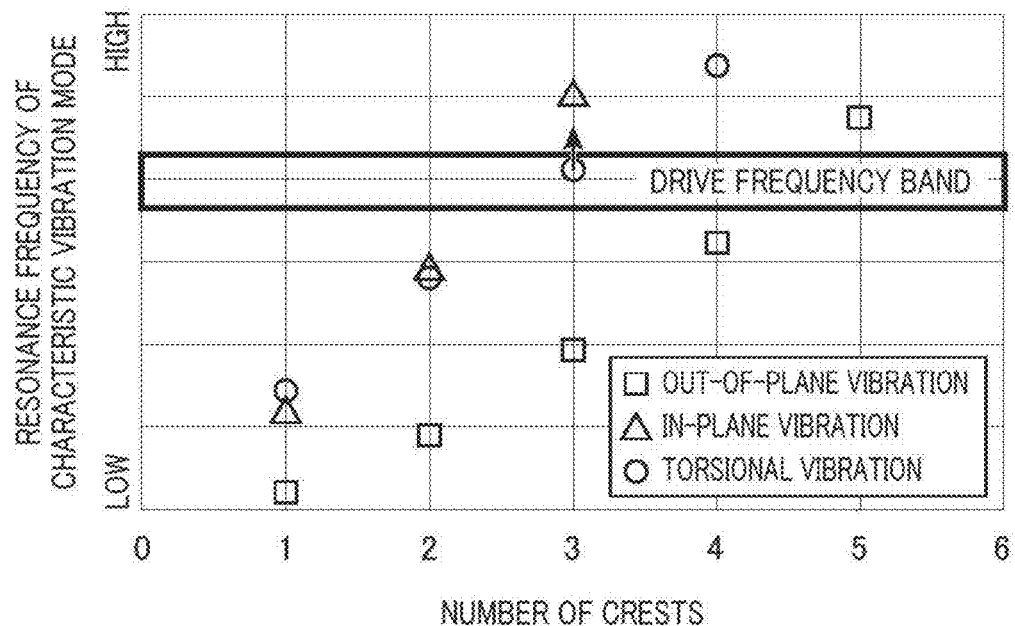
FIGS. 4A and 4B are diagrams useful in explaining respective characteristic vibration modes of the contact body appearing in FIGS. 1A to 1D and the contact body shown in FIGS. 3A to 3C.
Figure 4B:
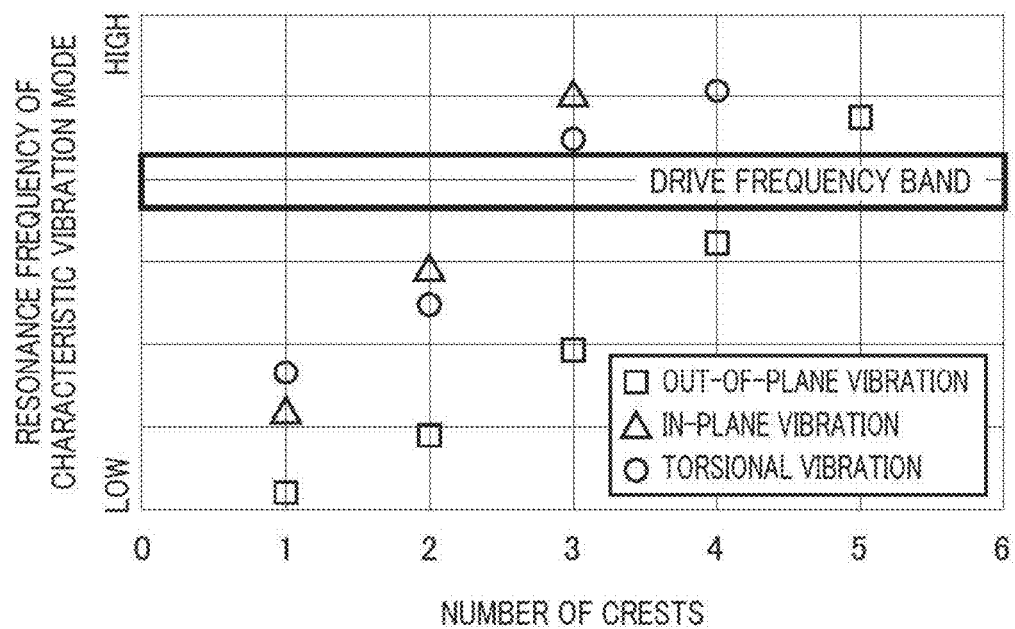

Next, a technical effect provided by the contact body 30 having the first section will be described. FIG. 4A is a diagram useful in explaining the characteristic vibration modes of the contact body 12. FIG. 4B is a diagram useful in explaining the characteristic vibration modes of the contact body 30. In FIGS. 4A and 4B, the horizontal axis represents the number of crests in the three types of vibration modes (the out-of-plane vibration, the in-plane vibration, and the torsional vibration) described with reference to FIGS. 2A to 2C, and the vertical axis represents the resonance frequency in each characteristic vibration mode. Note that the only three types of forms of vibrations, i.e. the out-of-plane vibration, the in-plane vibration, and the torsional vibration are considered because in the bar-shaped contact bodies 12 and 30 each having the four edges in the longitudinal direction, the forms of vibrations to be considered, which appear in a low-frequency band, are narrowed to these three types.

It is well known that in a beam having a fixed length, as the number of crests increases, the resonance frequency becomes higher, and therefore, with respect to the contact bodies 12 and 30 as well, the resonance frequency becomes higher as the number of crests increases in each vibration mode of the out-of-plane vibration, the in-plane vibration, and the torsional vibration.

The contact body 12 does not have a section corresponding to the first section provided in the contact body 30. Therefore, as shown in FIG. 4A, the resonance frequency of the vibration mode of torsional vibration (resonance frequency of vibration having three crests) is included in the drive frequency band of the vibration element 11. On the other hand, since the contact body 30 is provided with the first section including the R surface formed to have the large curvature radius, the resonance frequency of the torsional vibration having three crests is shifted toward the higher-frequency side to outside the drive frequency band of the vibration element 11.

Here, as is clear from comparison between FIGS. 4A and 4B, the resonance frequency of the out-of-plane vibration hardly changes and further, the resonance frequency of the in-plane vibration only slightly changes. Therefore, it is possible to selectively move the resonance frequency of the torsional vibration away from the drive frequency band of the vibration element 11 by providing the first section in the contact body, and as a result, it is possible to suppress generation of abnormal noise when driving the vibration actuator.

Figure 5:
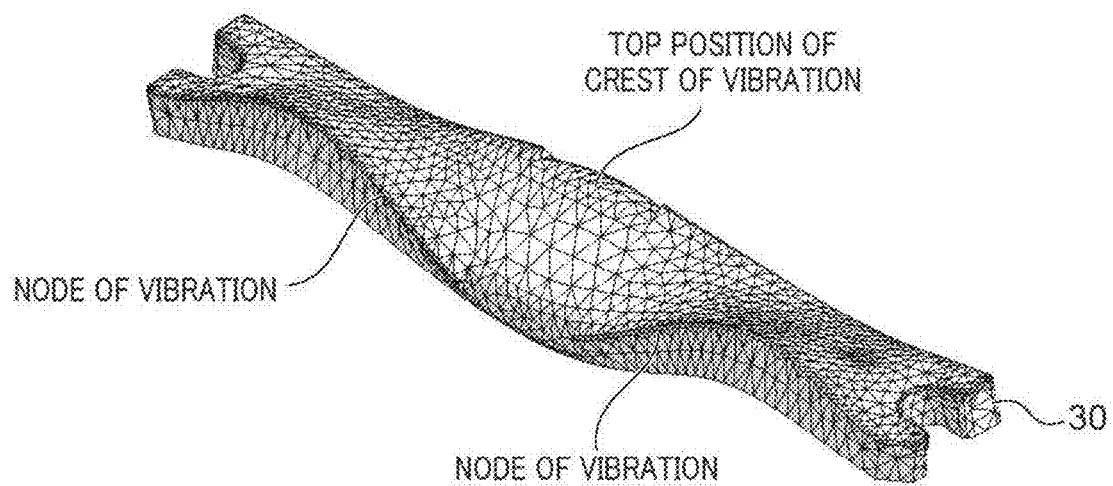
FIG. 5 is a schematic view showing a form of torsional vibration, which has three crests, of the contact body shown in FIGS. 3A to 3C.

The reason why the resonance frequencies of the in-plane vibration and the out-of-plane vibration hardly change but the resonance frequency of the torsional vibration largely changes will be described with reference to FIG. 5. FIG. 5 is a schematic view showing a form of torsional vibration, which has three crests, of the contact body 30. The top of the crest of the torsional vibration exists within the first section of the contact body 30. At this time, the mass of the crest of the torsional vibration is reduced by an amount of a portion of the edge portion removed by forming the R surface having the large curvature radius in the first section, which causes the resonance frequency to become high. Further, the top of the crest of the torsional vibration having one crest also exists in the first section. Therefore, the resonance frequency of the torsional vibration having one crest also becomes high. That is, the resonance frequency of the torsional vibration having an odd number of crests is increased by providing the first section formed with the R surface having the large curvature radius in the contact body 30.

On the other hand, in a case where the torsional vibration has an even number of crests, a node of the torsional vibration exists in the first section. At this time, due to provision of the R surface having the large curvature radius in the first section, a portion of the torsional vibration, which undergoes large distortion, is eliminated, so that the resonance frequency of the torsional vibration having an even number of crests becomes low. In other words, the first section is distant from the neutral axis of the torsional vibration, which has a significant influence on the geometrical moment of inertia, and hence the resonance frequency becomes lower by an amount corresponding to the mass eliminated by provision of the R surface having the large curvature radius.

Next, the limitation of the length of the first section in the longitudinal direction will be described. In a case where the first section is provided in a position of an antinode of vibration, this provides an effect of shifting the resonance frequency of the vibration to the higher-frequency side. Therefore, the length of the first section in the longitudinal direction is required to be set to a length between nodes of vibration having an order of frequency of which the resonance frequency is to be caused to be outside the drive frequency band, i.e. a length not larger than ½ of the wavelength. In the contact body 30, it is desirable that the length of the first section in the longitudinal direction is set to a length not larger than ½ of the wavelength of the torsional vibration having three crests.

Note that as for the out-of-plane vibration and the in-plane vibration, due to provision of the first section formed with the R surface having the large curvature radius, the portion which undergoes large distortion is partially eliminated, and hence the resonance frequency changes by the same mechanism as that of the torsional vibration. However, the influence of the first section in the out-of-plane vibration and the in-plane vibration on the geometrical moment of inertia is very small.

As described above, in the contact body 30, by providing the first section formed with the R surfaces each having the large curvature radius in the edges extending in the longitudinal direction, it is possible to control the resonance frequency of the torsional vibration without influencing the resonance frequencies of the out-of-plane vibration and the in-plane vibration. Thus, it is possible to move the resonance frequency of the torsional vibration out of the drive frequency band of the vibration element 11, whereby it is possible to suppress generation of abnormal noise.

Figure 6A:
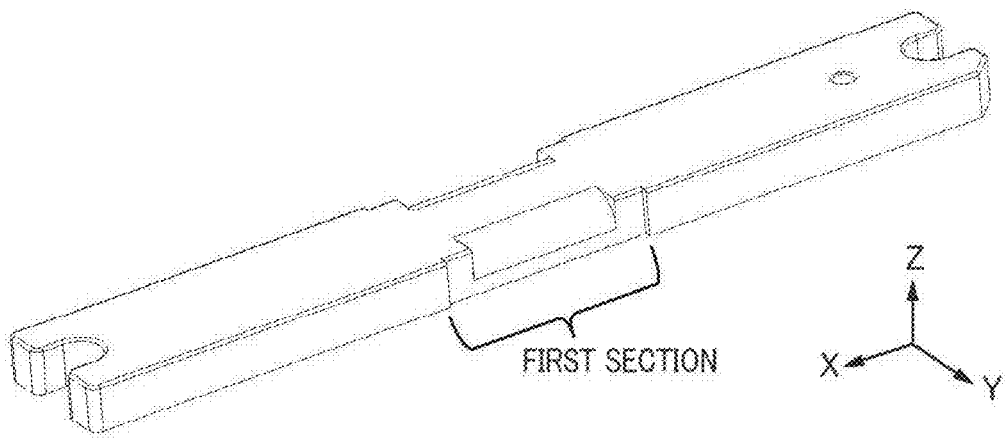
FIGS. 6A to 6C are views showing a variation of the contact body shown in FIG. 3A to 3C.
Figure 6B:
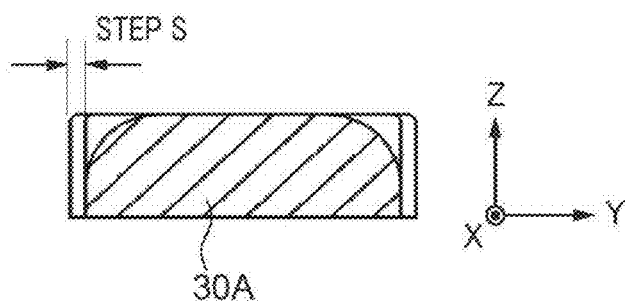
Figure 6C:
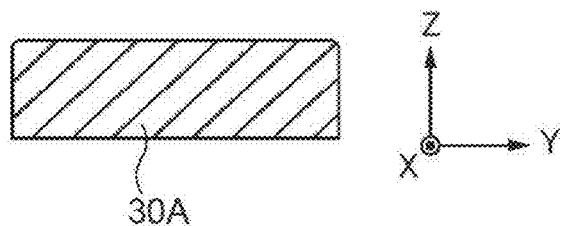

Next, a variation of the contact body 30 will be described. FIGS. 6A to 6C are views useful in explaining the structure of the contact body 30A. FIG. 6A is a perspective view of the appearance of the contact body 30A. FIG. 6B is a Y-Z cross-sectional view of the first section of the contact body 30A. FIG. 6C is a Y-Z cross-sectional view of the second section of the contact body 30A.

The contact body 30A is different from the contact body 30 in that a step S is provided so as to narrow the width of the first section but is the same as the contact body 30 in the other configuration. Therefore, in FIGS. 6A to 6C, the first section is clearly illustrated, and the reference numerals of the other portions are omitted. The following description will be given mainly of the first section having the step S.

The side surfaces of the first section is formed with respective steps by being removed to a certain depth in the Y direction, whereby the first section is made narrower in width than the second sections. Further, the first section is formed, within a range where the steps S are provided in the longitudinal direction, with the R surfaces each having a curvature radius larger than that of the second section.

Figure 7:
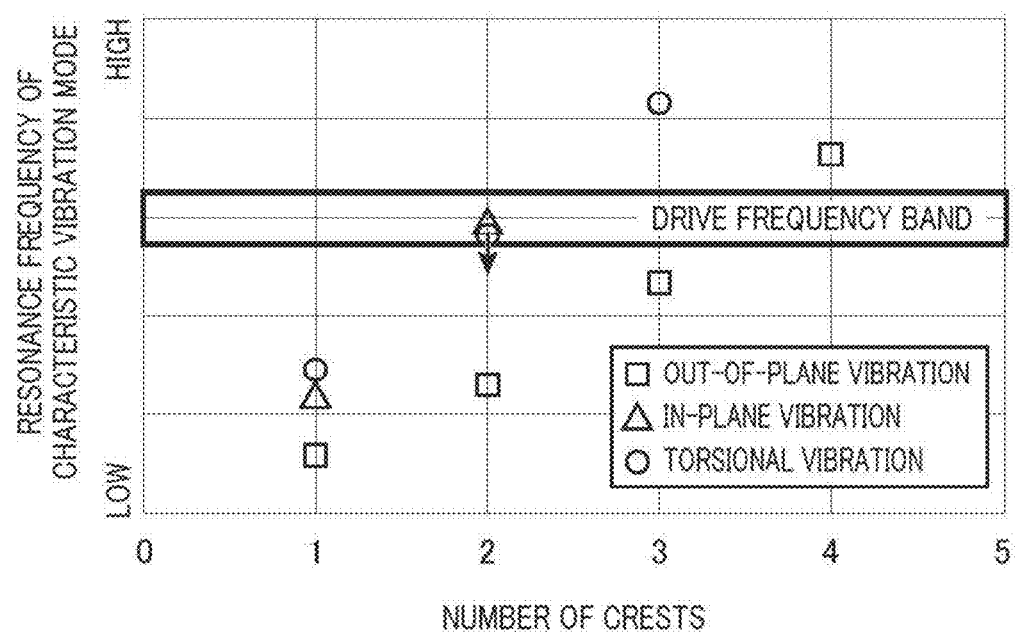
FIG. 7 is a diagram useful in explaining changes in resonance frequencies in the characteristic vibration modes, caused in a case where the contact body shown in FIGS. 6A to 6C is used.

FIG. 7 is a diagram useful in explaining changes in resonance frequencies in the characteristic vibration modes, which are caused in a case where the contact body 30A is used for the vibration actuator. In FIG. 7, the resonance frequencies in the respective vibration modes of a contact body which is not formed with the first section (contact body having the same structure as the contact body 12 shown in FIGS. 1A to 1D) are plotted. Here, the resonance frequencies of the torsional vibration and the in-plane vibration each having two crests are included in the drive frequency band. In the description with reference to FIGS. 4A and 4B, the influence of the R surfaces having the large curvature radius on the geometrical moment of inertia of the in-plane vibration is very small. On the other hand, in the contact body 30A, due to provision of the steps S in the side surfaces in the width direction, a portion which undergoes large distortion is not flat, which provides a significant influence on the geometrical moment of inertia of the in-plane vibration mode to shift the resonance frequency of the in-plane vibration to the lower-frequency side. Thus, it is possible to move the resonance frequency of the in-plane vibration having two crests outside the drive frequency band by shilling the resonance frequency to the lower-frequency side, and this state is indicated by an arrow in FIG. 7.

Thus, it is possible to selectively move the resonance frequencies of the torsional vibration and the in-plane vibration outside the drive frequency band by providing the first section, and as a result, it is possible to suppress generation of abnormal noise. Note that although in the contact body 30A, the width of the first section is made narrower than the width of the second section by providing the steps S, inversely, it is also possible to selectively move the resonance frequencies of the torsional vibration and the in-plane vibration outside the drive frequency band by making the width of the first section larger than the width of the second section.

Next, a description will be given of a contact body used for a vibration actuator according to a second embodiment of the present invention. The vibration actuator according to the second embodiment is a vibration actuator that performs rotational driving as described hereinafter with reference to FIG. 11 and includes a contact body having an annular shape. The outline configuration of the vibration actuator according to the second embodiment will be described hereinafter with reference to FIG. 11, and here, the structure of the contact body having the annular shape will be described in detail.

Figure 8A:
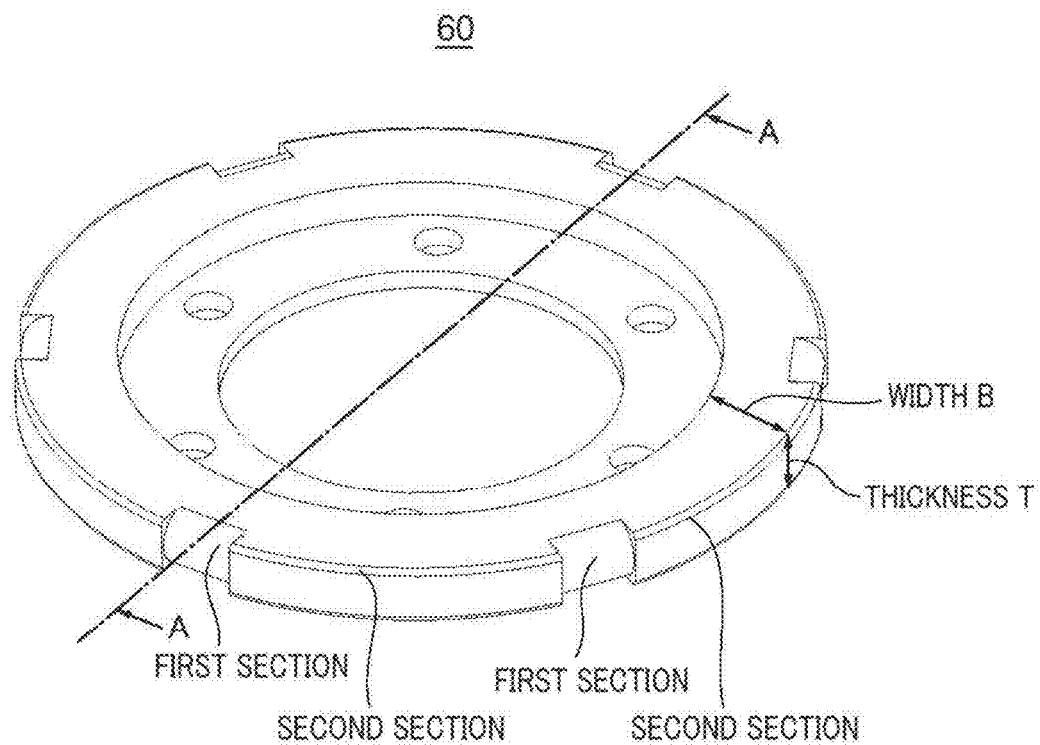
FIGS. 8A and 8B are views useful in explaining the structure of a contact body used in a vibration actuator according to a second embodiment.

FIG. 8A is a perspective view of the appearance of a contact body 60 used for the vibration actuator according to the second embodiment of the present invention. The contact body 60 has an annular shape and has an inner peripheral portion and an outer peripheral portion which are different in thickness. The inner peripheral portion of the contact body 60 is a portion for connecting to a rotating body, not shown, and is smaller in thickness than the outer peripheral portion. The outer peripheral portion has a width B in a radial direction and a thickness T, and one of the front and reverse surfaces parallel to the radial direction forms a frictional sliding surface that slides on the vibration element 11 (not show.

Figure 8B:
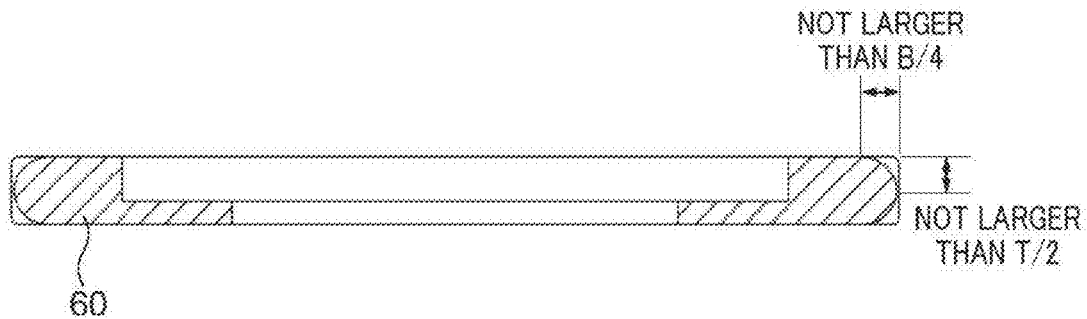

The outer periphery of the contact body 60 is formed with a plurality of first sections at equally-spaced intervals in a circumferential direction, and each portion between the adjacent first sections forms a second section. The first section is a section having an outer peripheral edge formed with an R surface having a large curvature radius, and the second section is a section having an outer peripheral edge formed with an R surface having a curvature radius relatively smaller than that of the first section. FIG. 8B is a cross-sectional view taken along A-A in FIG. 8A, in which a cross section of the first section is shown. The contact body 60 has the R surfaces each having the large curvature radius provided on the outer peripheral edges of both of the front and reverse surfaces. Note that the edges which may be formed with the R surface having the large curvature radius are limited to the outer peripheral edges on the front and reverse surface sides, and the R surfaces are not formed on the edges on the inner peripheral side of the outer peripheral portion. Here, although the R surfaces having the large curvature radius are provided on the outer peripheral edges on both of the front and reverse surface sides, the R surfaces may be formed on one of the outer peripheral edges.

As shown in FIG. 8B, the R surface in each first section of the contact body 60 is formed in an area extending on each of front and reverse surface sides over a length not larger than ¼ of a width B of the contact body 60 from the associated edges and extending on an outer peripheral side surface side over a length not larger than ½ of a thickness T of the contact body 60 from the associated outer peripheral edge. An amount of a portion of the first section removed by R-chamfering is configured to be not larger than the maximum amount assumed to be removed by C-chamfering under the limitation of the range of the above-mentioned dimensions. The other configuration of the first section is similar to the first section of the contact body 30, and hence description thereof is omitted.

Figure 9A:
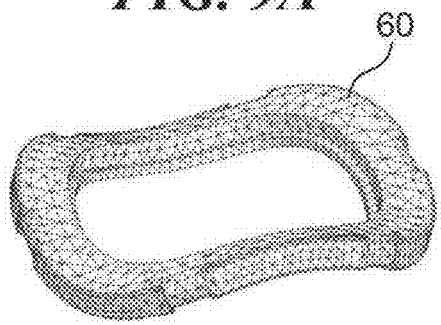
FIGS. 9A to 9F are views useful in explaining forms of vibrations in typical characteristic vibration modes of the contact body shown in FIGS. 8A and 8B.
Figure 9B:
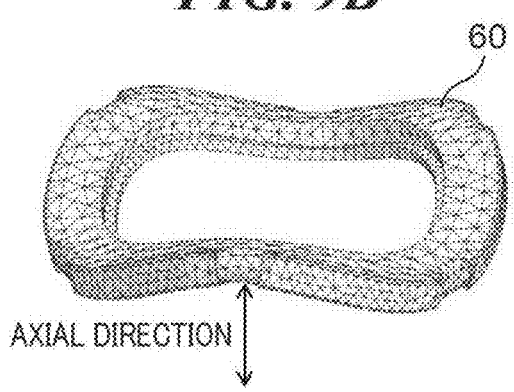
Figure 9C:
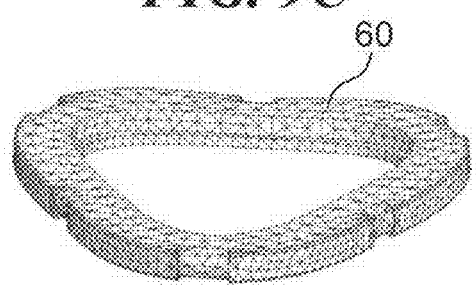
Figure 9D:
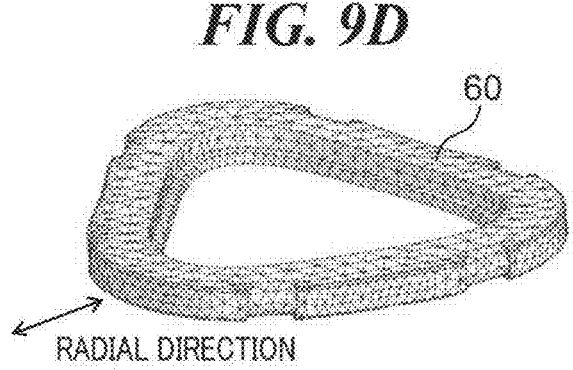
Figure 9E:
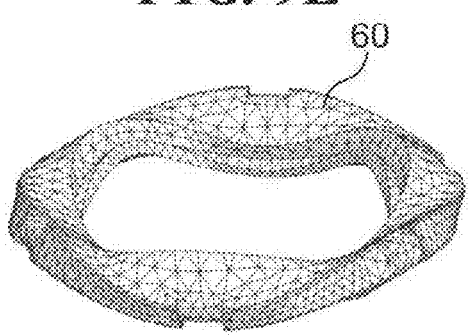
Figure 9F:
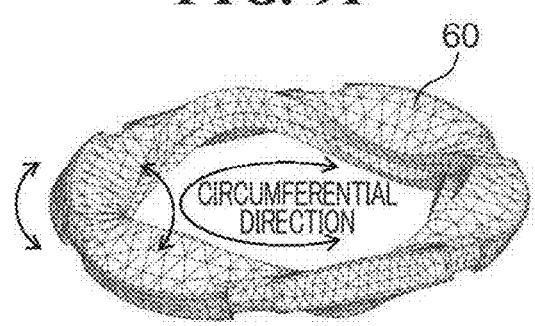

FIGS. 9A to 9F are views useful in explaining forms of vibrations in the typical characteristic vibration modes of the contact body 60. FIGS. 9A and 9B are views schematically showing the out-of-plane bending vibration having an amplitude in the axial direction of the contact body 60. FIGS. 9C and 9D are views schematically showing the in-plane bending vibration having an amplitude in the radial direction of the contact body 60. FIGS. 9E and 9F are views schematically showing the torsional vibration having an amplitude of torsion about a rotational axis in the circumferential direction of the contact body 60. Here, although FIGS. 9A to 9F show resonance modes each having six crests of vibration by way of typical examples, there are characteristic vibration modes having different numbers of crests on a lower-frequency side and a higher-frequency side.

Vibration modes of the contact body 60 are characterized in that in general, even vibration modes having the same number of crests include two modes referred to as a sin mode and a cos mode. One of these modes has a top position of the crest in the first section, and the other mode has a node position in the first section. At this time, the former is reduced in the mass at the position of the crest, and hence the resonance frequency of the torsional vibration is made higher. Inversely, the latter has a portion which undergoes large distortion position is eliminated, which lowers the resonance frequency of the torsional vibration. Therefore, a difference is generated between the resonance frequencies of the sin mode and the cos mode of the torsional vibration mode having the same number of crests.

In the vibration actuator that frictionally drives the annular contact body, it is known that abnormal noise is generated by exciting traveling waves in a specific vibration mode in the contact body. On the other hand, in the contact body 60, a difference is generated between the resonance frequencies in the two vibration modes of the sin mode and the cos mode forming the traveling waves, and hence vibrating energy from the vibration element does not lead to generation of the traveling waves, and as a result, it is possible to suppress generation of abnormal noise. Note that the formation of the R surface having the large curvature radius does not have a significant influence on the resonance frequencies in the vibration modes of the out-of-plane vibration and the in-plane vibration for the same reason as that for the contact body 30.

Thus, in the annular contact body 60, by providing the first sections each formed with the R surface having the large curvature radius on the outer peripheral edge, it is possible to control the resonance frequency of the torsional vibration without substantially influencing the out-of-plane vibration and the in-plane vibration. As a result, it is possible to suppress generation of abnormal noise.

Figure 10A:
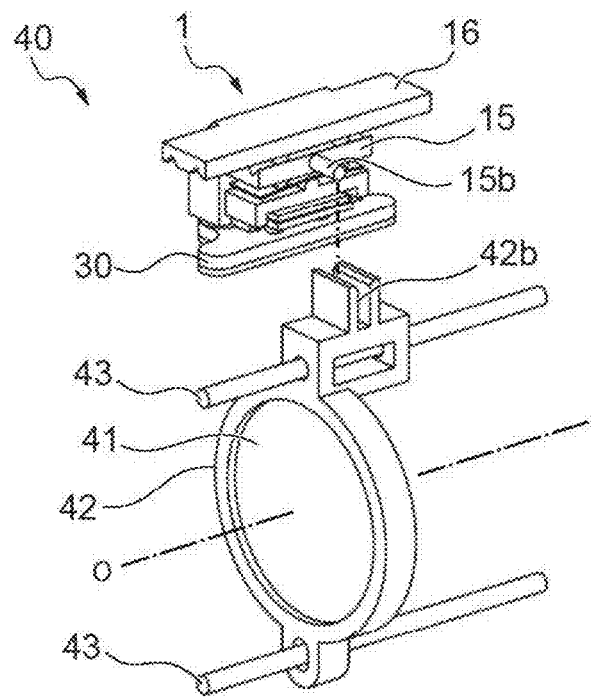
FIGS. 10A to 10C are views showing an outline configuration of a lens driving device.
Figure 10B:
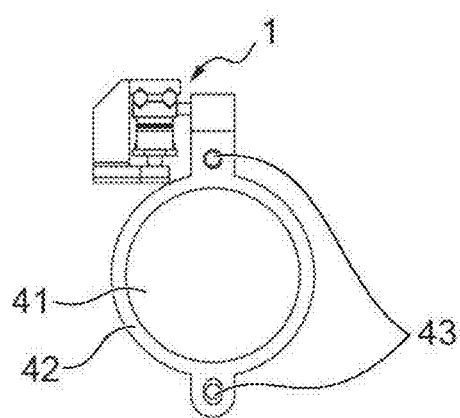
Figure 10C:
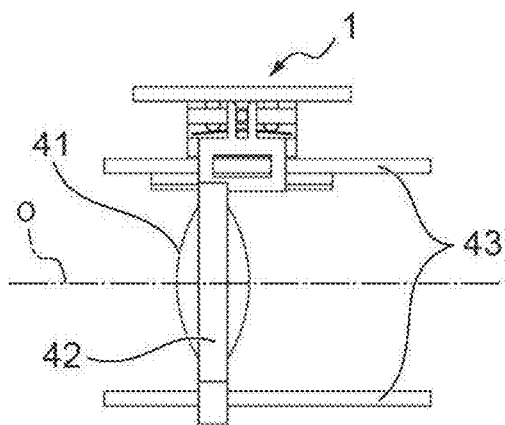

Next, an example of an optical device using the vibration actuator will be described. FIG. 10A is a view showing an outline configuration of a lens driving device 40. FIG. 10B is a front view of the lens driving device 40. FIG. 10C is a side view of the lens driving device 40.

A vibration actuator which is functionally the same as the vibration actuator 1 shown in FIGS. 1A to 1D is used for the lens driving device 40 shown in FIGS. 10A to 10C, and hence the same reference numerals are used while omitting detailed description. FIGS. 10A to 10C show the configuration of the lens driving device 40 in a simplified manner. The lens driving device 40 includes the vibration actuator 1, an optical lens 41 (optical component), a lens holding member 42, and guide members 43.

The optical lens 41 is e.g. a focus lens used in a lens barrel of an image capturing apparatus. The lens holding member 42 holds the optical lens 41. The guide members 43 are inserted through holes formed in the lens holding member 42, and opposite ends of each guide member 43 in this state are fixed in substantially parallel to an optical axis 0 of the optical lens 41 within the lens barrel. With this, the optical lens 41 is guided by the guide members 43 such that the optical lens 41 is movable in the optical axis direction.

The lens holding member 42 is provided with a fitting portion 42b. Further, the guided member 15 of the vibration actuator 1 is provided with a fitting protrusion 15b which is fitted in the fitting portion 42b. The fixing member 16 is fixed in a predetermined position within the lens barrel such that the fitting protrusion 15b is fitted in the fitting portion 42b and the direction in which the guided member 15 is moved is substantially parallel to the optical axis 0. Therefore, by driving the vibration actuator 1 to cause the guided member 15 to move in the optical axis direction, it is possible to move the optical lens 41 in the optical axis direction.

In the lens barrel equipped with this lens driving device 40, to realize size reduction of the lens barrel, there is a strong demand for size reduction of the vibration actuator. Size reduction of the vibration actuator has a possibility, as described hereinabove, of causing generation of abnormal noise in the audible region because the resonance frequency in the characteristic vibration mode of the contact body 60 enters the drive frequency band. To cope with this problem, the above-described configuration of the contact body 30 is applied to the contact body as a component of the vibration actuator, whereby it is possible to realize size reduction of the vibration actuator by thinning the thickness and reducing the size of the contact body while suppressing generation of abnormal noise.

Figure 11:
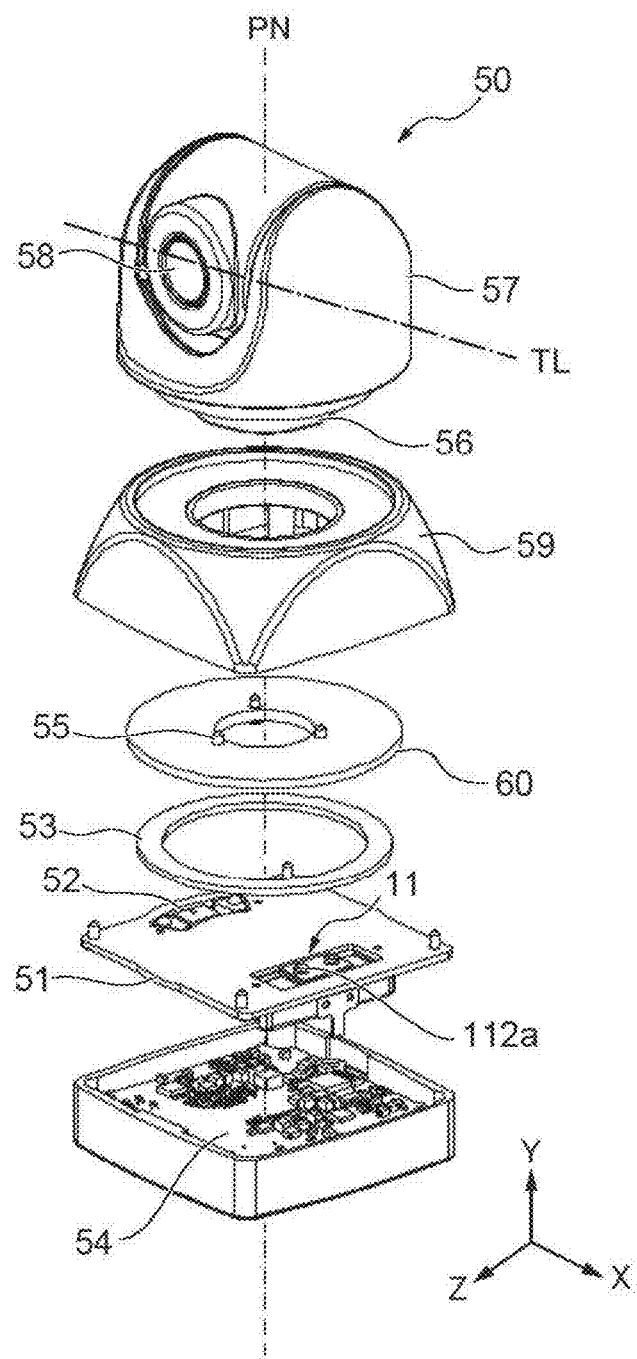
FIG. 11 is an exploded perspective view showing an outline configuration of a pan/tilt driving device.

FIG. 11 is an exploded perspective view of a pan/tilt driving device 50 using the vibration actuator. An image capturing unit 57 supports a lens barrel 58 incorporating optical components, such as a variety of lenses and a diaphragm, such that the lens barrel 58 is rotatable about a tilt rotational axis TL. The image capturing unit 57 is a driven component of the pan/tilt driving device 50 and is supported by an intermediate cover 59 such that the image capturing unit 57 is rotatable about a pan rotational axis PN in unison with the lens barrel 58. A connection member 56 is connected to the contact body 60 with screws 55, and with this, the contact body 60 and the image capturing unit 57 are connected to each other. The intermediate cover 59 is fixed to a base 54.

In FIG. 11, the whole configuration of the vibration actuator 1 is not shown. The vibration actuator 1 is held on an actuator supporting board 51, and the actuator supporting board 51 is fixed to the base 54. The two protrusions 112a of the vibration element 11 are brought into contact with a surface of the contact body 60 on the −Y side. The drive force of the vibration actuator acts in the direction of the tangent of the contact body 60 to rotate the contact body 60 about the pan rotational axis PN, whereby the image capturing unit 57 is also rotated about the pan rotational axis PN. The contact body 60 holds a scale 53 for position detection. The scale 53 is arranged on a surface opposed to a position detection sensor 52 fixed on the actuator supporting board 51, and a rotational angle of the contact body 60 can be determined by the position detection sensor 52. Note that as the actuator for driving the lens barrel 58 for rotation about the tilt rotational axis TN, an actuator equivalent to the actuator for rotating the image capturing unit 57 about the pan rotational axis PN can be used.

In the pan/tilt driving device 50, it is also possible to realize size reduction of the vibration actuator while suppressing generation of abnormal noise for the same reason as that for the lens driving device 40.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-031805 filed Mar. 1, 2021, which is hereby incorporated by reference herein in its entirety.

What is claimed is:
1. A vibration actuator comprising:
   a vibration element including an electromechanical energy conversion element and an elastic member; and
   a contact body in contact with the vibration element,
   wherein the contact body has a direction in which the vibration element and the contact body move relative to each other as a longitudinal direction, and a square bar shape which is substantially uniform in width and thickness in the longitudinal direction, and includes a first section and a second section which are formed with respective R surfaces different in curvature radius on an edge extending in the longitudinal direction, in an area where the contact body performs frictional sliding on the vibration element.
2. The vibration actuator according to claim 1, wherein a curvature radius of the first section is larger than a curvature radius of the second section, and the first section is provided at a position corresponding to an antinode or a node of a torsional vibration mode of the contact body.

3. The vibration actuator according to claim 2, wherein the contact body has a plurality of the first sections.

4. The vibration actuator according to claim 2, wherein a length of the first section in a direction in which the contact body moves relative to the vibration element is not larger than ½ of a wavelength of a torsional vibration mode of an order closest to a drive frequency band of the vibration element.

5. The vibration actuator according to claim 4, wherein a width of the first section is smaller than a width of the second section.

6. The vibration actuator according to claim 5, wherein in the first section, a length of an area where the R surface is formed is shorter than a length of an area which is smaller in width than the second section, in the direction in which the contact body moves relative to the vibration element.

7. The vibration actuator according to claim 1, wherein the R surface in the first section is formed in an area extending on a surface parallel to a width direction over a length not larger than ¼ of a width from an edge and extending on a surface parallel to a thickness direction over a length not larger than ½ of a thickness from the edge, in a cross section orthogonal to the direction in which the contact both moves relative to the vibration element.

8. A vibration actuator comprising:
   a vibration element including an electromechanical energy conversion element and an elastic member; and
   a contact body in contact with the vibration element,
   wherein the contact body has an annular shape substantially uniform in width in a radial direction and thickness in an axial direction, in which a surface parallel to the radial direction is a frictional sliding surface on the vibration element, and includes a first section and a second section having respective R surfaces different in curvature radius formed on an outer peripheral edge.

9. The vibration actuator according to claim 8, wherein a curvature radius of the first section is larger than a curvature radius of the second section, and the first section is provided in a position corresponding to an antinode or a node of a torsional vibration mode of the contact body.

10. The vibration actuator according to claim 9, wherein the contact body has a plurality of first sections.

11. The vibration actuator according to claim 9, wherein a length of the first section in a direction in which the contact body moves relative to the vibration element is not larger than ½ of a wavelength of a torsional vibration mode of an order closest to a drive frequency band of the vibration element.

12. The vibration actuator according to claim 11, wherein a width of the first section is smaller than a width of the second section.

13. The vibration actuator according to claim 12, wherein in the first section, a length of an area where the R surface is formed is shorter than a length of an area which is smaller in width than the second section, in the direction in which the contact body moves relative to the vibration element.

14. The vibration actuator according to claim 8, wherein the R surface in the first section is formed in an area extending on a surface parallel to a width direction over a length not larger than ¼ of a width from an edge and extending on a surface parallel to a thickness direction over a length not larger than ½ of a thickness from the edge, in a cross section orthogonal to the direction in which the contact body moves relative to the vibration element.

15. An optical device including:
   a vibration actuator, and
   an optical component driven by the vibration actuator,
   the vibration actuator comprising:
   a vibration element including an electromechanical energy conversion element and an elastic member; and
   a contact body in contact with the vibration element,
   wherein the contact body has a direction in which the vibration element and the contact body move relative to each other as a longitudinal direction, and a square bar shape which is substantially uniform in width and thickness in the longitudinal direction, and includes a first section and a second section which are formed with respective R surfaces different in curvature radius on an edge extending in the longitudinal direction, in an area where the contact body performs frictional sliding on the vibration element.

16. An optical device including:
   a vibration actuator, and
   an optical component driven by the vibration actuator,
   the vibration actuator comprising:
   a vibration element including an electro mechanical energy conversion element and an elastic member; and
   a contact body in contact with the vibration element,
   wherein the contact body has an annular shape substantially uniform in width in a radial direction and thickness in an axial direction, in which a surface parallel to the radial direction is a frictional sliding surface on the vibration element, and includes a first section and a second section having respective R surfaces different in curvature radius formed on an outer peripheral edge.

* * * * *